United States Patent
Mochizuki

(10) Patent No.: US 6,561,658 B2
(45) Date of Patent: May 13, 2003

(54) AUTOMOBILE DOOR MIRROR

(75) Inventor: Toshihiro Mochizuki, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 09/926,659

(22) PCT Filed: May 21, 2001

(86) PCT No.: PCT/JP01/04206
§ 371 (c)(1),
(2), (4) Date: Nov. 29, 2001

(87) PCT Pub. No.: WO01/89881
PCT Pub. Date: Nov. 29, 2001

(65) Prior Publication Data
US 2002/0135904 A1 Sep. 26, 2002

(30) Foreign Application Priority Data
May 25, 2000 (JP) ........................... 2000-154121

(51) Int. Cl.⁷ .................................. G02B 7/18
(52) U.S. Cl. ................. 359/841; 359/842; 359/843; 359/871; 359/872
(58) Field of Search ................. 359/841, 842, 359/843, 871, 872, 877; 248/475.1, 476, 479

(56) References Cited

U.S. PATENT DOCUMENTS 5,383,057 A * 1/1995 Kimura et al. ............ 248/485
5,636,071 A * 6/1997 Mochizuki et al. ......... 248/476
5,867,328 A * 2/1999 Stapp et al. ................ 248/549
6,243,218 B1 * 6/2001 Whitehead .................. 359/841

FOREIGN PATENT DOCUMENTS

| JP | 8-183392 | 7/1996 |
| JP | 9-99780 | 4/1997 |

* cited by examiner

*Primary Examiner*—Mohammad Sikder
(74) *Attorney, Agent, or Firm*—Oblon, Spivak, McClelland, Maier & Neustadt, P.C.

(57) ABSTRACT

A rotation restricting structure of an automobile door mirror, in which a shaft is erected on the top surface of a projection portion of a mirror base, and in which a frame for supporting a mirror body is turnably fitted onto the shaft, wherein a stopper member for restricting a turning angle by engaging with the frame is provided between the frame and the shaft. The stopper member includes a projection, which is formed on the shaft base portion in such a way as to be integral therewith, and an angle adjusting plate provided separately from the projection. The adjusting plate having a thickness corresponding to a folding angle of the door mirror is attached to each or one of both the opposite side surfaces of the projection. Thus, even when the folding angle of the mirror body is changed, the frame and the shaft can be used in common among the door mirrors. Moreover, the strength of the stopper can be increased.

4 Claims, 3 Drawing Sheets

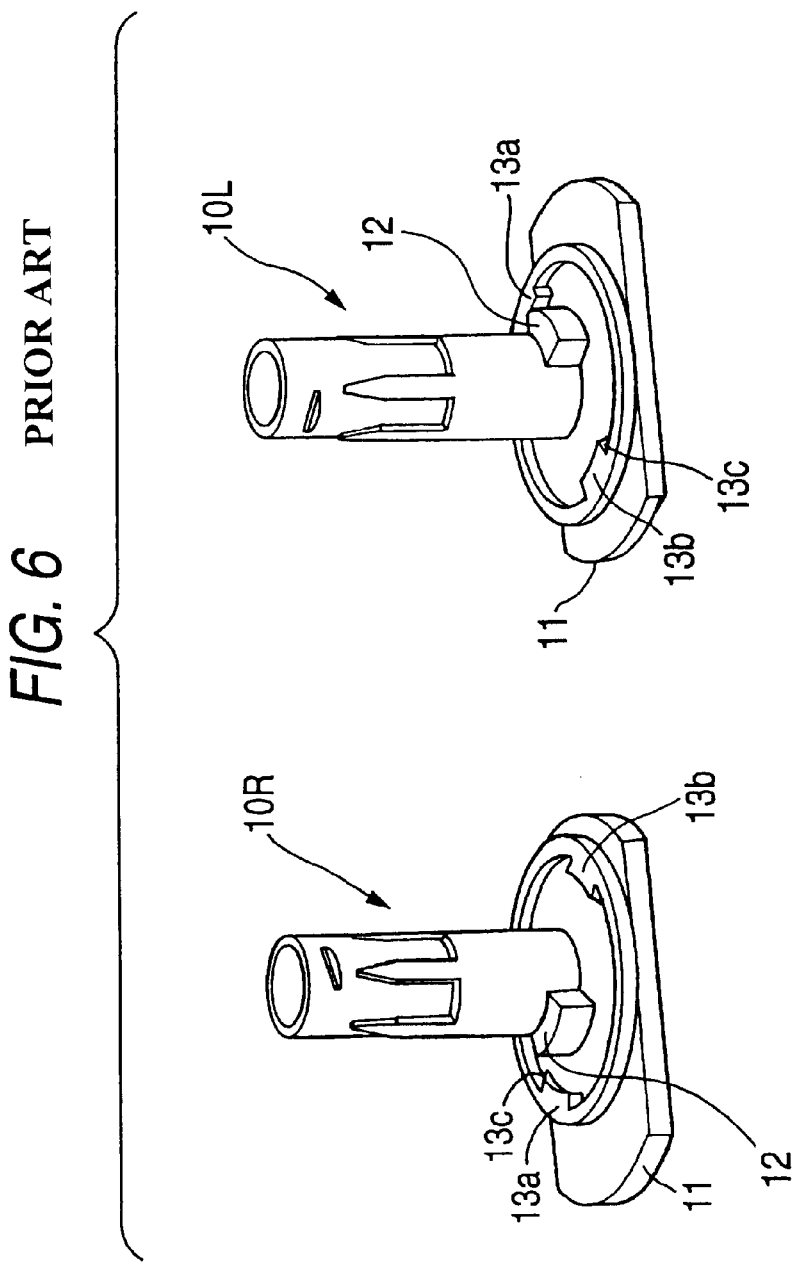

AUTOMOBILE DOOR MIRROR

TECHNICAL FIELD

This invention relates to an automobile door mirror. More particularly, the invention relates to a door mirror constructed by providing a positioning member on a shaft serving as a rotating shaft of a body mirror in an electrically driven housing type mirror or foldable type mirror adapted to turn the mirror body between an erected position (i.e., a position when in use) and a housed position (i.e., a folded position).

BACKGROUND ART

An automobile door mirror has a configuration in which a mirror body is attached to a mirror base projecting from an outer plate of a vehicle. Recent door mirrors ordinarily employ a configuration in which a mirror body is driven in such a manner as to rotate around a spindle between the used position (i.e., a neutral position) and the housed position. When placed in the housed position, or when having a configuration adapted so that when an external force or shock is applied to the mirror body, the mirror body is folded forward or backward to thereby avoid a shock force being applied thereto.

Hitherto, generally, an angle restriction at the time of housing (i.e., folding) or returning the mirror body is performed by providing a stopper on the shaft of the mirror body in such a way as to be integral with each other.

FIG. 6 is an explanatory, perspective view illustrating a shaft of a conventional door mirror. Reference character 10R designates a right-hand side shaft, and 10L denotes a left-hand side shaft. Each of these shafts 10R and 10L is provided with a stopper (including a folding-angle adjusting convex portion 12 and a set of neutral position locating convex portions 13a and 13b) disposed on a shaft base portion 11 in such a manner as to be integral with each other.

As is obvious from FIG. 6, each of the folding angle adjusting convex portion 12 and the neutral position locating convex portions 13a and 13b corresponding to one of the left-hand side shaft R and the right-hand side shaft L is disposed at a position differing in set angle from a position of a corresponding one of the portions 12, 13a, and 13b corresponding to the other shaft R or L. The neutral position locating convex portions 13a and 13b corresponding to each of the shafts R and L are respectively formed at a pair of positions (i.e., two positions), which are opposed to each other across the shaft. Further, a slope 13c is formed at two opposed places respectively set on side surface portions, which are angularly spaced at an angular interval of 180 degrees, of each of the convex portions.

As described above, the conventional door mirror shafts 10R and 10L are respectively formed on the mounting sides thereof separately from each other.

However, the folding angles of mirror bodies differ with the type of an automobile. Thus, it has been difficult to employ the shaft in common among automobiles of the types. Therefore, the shafts corresponding to each of the types of automobiles are manufactured. Consequently, the conventional door mirror has a drawback in that the productivity thereof is not increased.

Further, because the strength of the stopper is determined according to the material thereof, it is difficult to select the material of the shaft. That is, a load imposed on the stopper is large owing to a moment produced at the mounting position thereof. Hence, there is the necessity of preventing the stopper from being deformed or damaged. Consequently, it is difficult to form the stopper from a resin. Thus, usually, the stopper is formed from metal.

Recently, the inventor of the present invention has proposed a structure for restricting the rotation of a door mirror, which permits the use of a frame and a shaft in common even when the folding angle of a mirror body is changed (see Unexamined Japanese Patent Publication No. Hei. 8-183392).

According to this background art invention, there is provided a door mirror adapted so that each of a left-hand side mirror body and a right-hand side body is folded in a frontward direction or a backward direction from an erected position by fixing a shaft base portion onto the top surface of a projection portion of a mirror base thereby to erect a shaft, and by restricting a turning angle of each of the left-hand side mirror body and the right-hand side mirror body, which rotate around the shaft, between the shaft and the corresponding mirror body. This door mirror has an elongated circularly arcuate hole formed in the shaft base portion disposed at a place that is away from a shaft center, a convex rotation restricting member erected in such a way as to penetrate through the elongated circularly arcuate hole of the shaft base portion from a bottom part of the projection portion, and a circularly arcuate guide groove formed in the bottom surface of a frame base portion in such a manner as to be engaged with an upper portion of the convex rotation restricting member. The upper portion, which is engaged in the circularly arcuate guide groove, of the convex rotation restricting member has a size corresponding to a folding angle of each of a left-hand side door mirror and a right-hand door mirror.

In the case of the door mirror according to the background art invention, when the door mirror is turned from the erected position until the rotation restricting member abuts against one of end portions of the circularly arcuate guide grooves, the door mirror is stopped at a restricting position for restricting a forward or backward folding operation. In this manner, restriction of a forward or backward folding operation is conducted by performing rotation restriction between the convex rotation restricting member, which is provided on the base in such a manner as to protrude therefrom, and the circularly arcuate guide groove provided in the bottom surface portion of the frame. Thus, even among different types of automobiles, the frame and the shaft can be used in common between the left-hand side door mirror and the right-hand side door mirror only by setting the size of the convex rotation restricting member formed on each of the bases of these mirrors at a size that corresponds to the folding angle of a corresponding one of the left-hand side door mirror and the right-hand side door mirror.

However, even in this door mirror of the background art invention, a load imposed on the stopper (that is, the concave rotation restricting member) during turning the mirror body is large. Thus, there is the need for taking the countermeasure of preventing the occurrences of deformation of and damage to the stopper.

In recent years, there has been tendency to have the base be made of resin. However, it is understood that when the convex rotation restricting member and the base are integrally formed, the stopper may be deformed or damaged by a collision with or the application of a shock thereto during turning of the door mirror, and thus, the stopper cannot perform essential functions. Therefore, it is necessary to increase the strength of the stopper.

The invention is accomplished in view of the aforementioned circumstances. An object of the invention is to provide a structure for employing a frame and a shaft in common among door mirrors, in each of which a stopper member for restricting a folding angle of a mirror body is integrally formed on the shaft of the mirror body, and to increase the strength of the stopper.

DISCLOSURE OF INVENTION

According to the invention, there is provided a door mirror, in which a shaft is erected on the top surface of a projection portion of a mirror base, and in which a frame for supporting a mirror body is turnably fitted onto the shaft, and in which a stopper member for restricting a turning angle by engaging with the frame is provided between the frame and the shaft. In this door mirror, the stopper member comprises a projection, which is formed on the shaft base portion in such a way as to be integral therewith, and an angle adjusting plate which is provided separately from the projection. Moreover, the adjusting plate having a thickness corresponding to a folding angle of the door mirror is attached to each or one of both the opposite side surfaces of the projection.

Incidentally, preferably, the adjusting plate may be fixed to one of the shaft and the mirror base, and placed on each or one of both the side surfaces of the projection.

The adjusting plate may be fixed to the projection by one of fixing means that include screwing, bonding, and fitting.

Further, the adjusting plates respectively attached to both the side surfaces of the projection in such a way as to sandwich the projection may be formed in such a way as to have thicknesses differing from each other.

BRIEF DESCRIPTION OF DRAWINGS

FIG. 6 is a perspective view (or explanatory view) illustrating a shaft for use in a conventional door mirror.

BEST MODES FOR CARRYING OUT THE INVENTION

Embodiments of the invention are concretely described hereinbelow with reference to the accompanying drawings.

Figure 1:
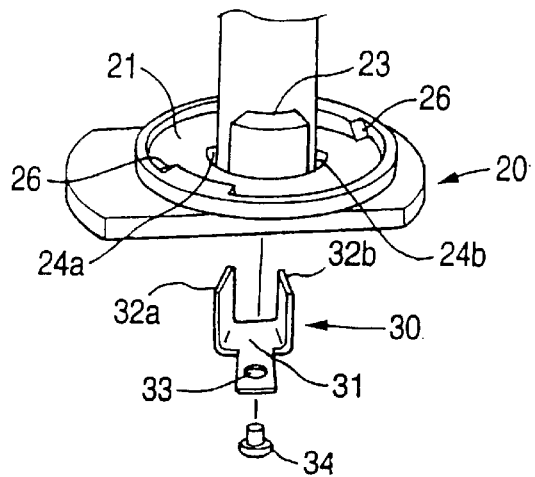
FIG. 1 is an exploded perspective view illustrating a shaft base portion of an L-side door mirror according to the invention, and an angle adjusting plate to be used by being combined therewith.
Figure 2:
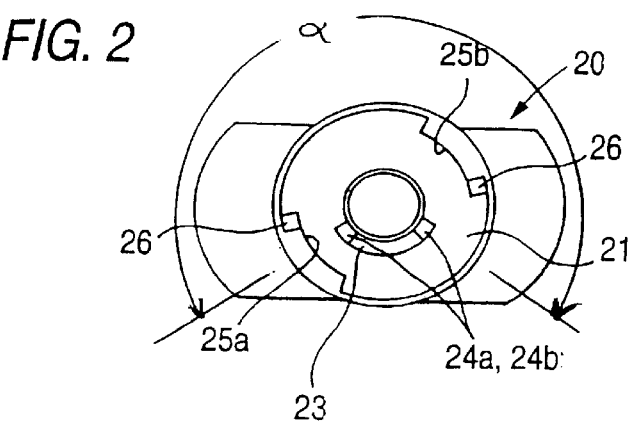
FIG. 2 is a view illustrating the shaft, which is shown in FIG. 1 and taken from above.
Figure 3:
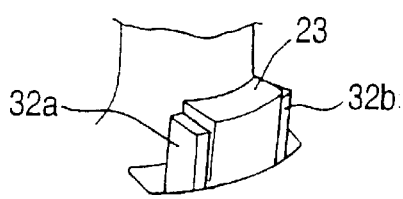
FIG. 3 is a perspective view illustrating a primary part in which the angle adjusting plate is attached to the backward side of the shaft base portion.

FIGS. 1 to 3 illustrate an embodiment of the invention. Incidentally, these figures exemplarily illustrate a shaft of a right-hand side (that is, R-side) door mirror between a left-hand side door mirror and the right-hand side door mirror. FIG. 1 is a perspective view thereof. FIG. 2 is a view thereof taken from above. Additionally, the illustration of a shaft of an L-side door mirror is omitted.

In FIGS. 1 and 2, reference character 20 designates a shaft, and 21 denotes a shaft base portion. This base portion 21 and a circularly arcuate projection 23 for restricting a folding angle of a frame are integrally formed. This projection 23 is preliminarily formed in such a way as to have a predetermined certain size corresponding to a minimum folding angle of the door mirror. Further, a set of through holes 24a and 24b are formed on both sides of this projection. Incidentally, reference characters 25a and 25b denote a set of neutral position locating convex portions, which are formed at places opposed to each other across the shaft. Slopes 26 are formed at two places on opposed side surfaces of the convex portions, which are angularly spaced at an angular interval of 180 degrees.

Incidentally, when the door mirror is turned from an erected position until a frame (not shown) abuts against bending pieces 32a and 32b of an angle adjusting plate hereinafter referred to for restricting the folding angle , the door mirror is stopped at a restricting position for restricting a forward or backward folding operation.

In FIG. 1, reference numeral 30 designates an angle adjusting plate for adjusting the folding angle, which is provided separately from the projection 23. This angle adjusting plate 30 is formed by upwardly bending both side parts of the base portion 31 in a substantially U-shaped manner. Opposed bending pieces 32a and 32b are inserted into a set of through holes 24a and 24b provided at both sides of the circularly arcuate projection 23, respectively. The bending pieces 32a and 32b are disposed on both side surfaces of the projection 23. Incidentally, reference numeral 33 designates a mounting hole provided in the base portion, and reference numeral 34 denotes a mounting screw.

FIG. 3 illustrates an example in which the angle adjusting plate 30 is attached to the rear side of the shaft base portion 21 with a mounting screw 34 and in which the bending pieces 32a and 32b are inserted into a set of through holes 24a and 24b, which are provided at both sides of the circularly arcuate projection 23.

Figure 4:
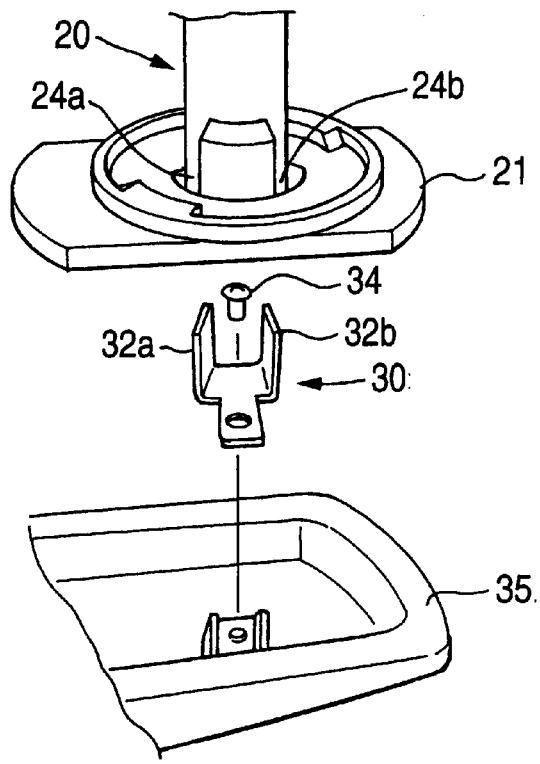
FIG. 4 is an exploded perspective view illustrating a primary part of another embodiment of the invention.

FIG. 4 is an exploded perspective view illustrating a primary part of another embodiment of the invention. The embodiment illustrated in this figure is an example in which the angle adjusting plate 30 is mounted on the top surface of the projection portion 35 of the mirror base with the mounting screw 34.

In this example, the shaft has a structure similar to that illustrated in FIG. 1. Further, this embodiment is used by respectively inserting the bending pieces 32a and 32b of the angle adjusting plate 30 the through holes 24a and 24b provided in the base portion 21 of the shaft, and by then placing the bending pieces 32a and 32b at both sides of the projection.

Figure 5A:
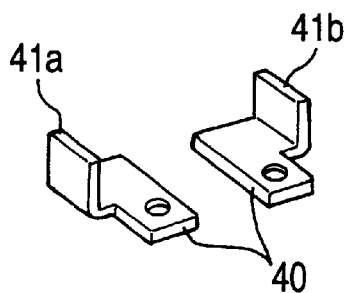
FIG. 5 is a perspective view illustrating a modification of the angle adjusting plate.
Figure 5B:
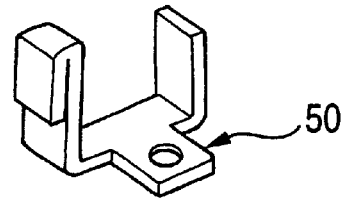

Further, FIGS. 5A and 5B illustrate a modification of the angle adjusting plate. That is, the structure of the angle adjusting plate is not limited to those illustrated in FIGS. 1 and 4. For example, the structure of the angle adjusting plate of the invention may be that of the angle adjusting plate 40, which is L-shaped and attached to one of side surfaces of the circularly arcuate projection 23 for restricting the folding angle of the frame, as shown in FIGS. 2 and 5A. This angle adjusting plate 40 is able to be attached to a necessary one of both side surfaces of the projection 23, differently from the U-shaped plate designated by reference numeral 30 in FIG. 1. Incidentally, this angle adjusting plate 40 is adapted so that the thickness of each of the bending pieces 41a and 41b is set at an arbitrary value so as to adjust the folding angle of the frame.

The angle adjusting plate 50 shown in FIG. 5B is an example adapted so that one 51a of two opposed bending pieces is thicker than the other bending piece 51b, differently from the case of the U-shaped plate adjusting plate shown in FIG. 1. The folding angle of the frame can be adjusted by placing the angle adjusting plate 50 on both side surfaces of the projection and by using such the angle adjusting plate 50.

With the aforementioned configuration, the folding angle of the frame of a vehicle, in which the folding angle of the door mirror corresponds to a minimum folding angle, is restricted only by the projection 23 directly provided on the base portion of the shaft without attaching the angle adjusting plate thereto.

In the case of vehicles differing in the folding angle from one another, the adjustment of such a folding angle is performed by inserting the angle adjusting plate 30, 40, or 50, which is shown in FIGS. 1, 4, or 5, into the through holes 24a and 24b from the rear surface of the shaft in such a way as to sandwich the projection and as to be attached to both side surfaces or one of the side surfaces of the projection to there by correspond to the folding angle of the door mirror.

Incidentally, although the angle adjusting plate is usually formed from metal so as to reinforce the strength of the projection, the angle adjusting plate may be formed from a resin. Alternatively, the angel adjusting plate may be formed from a rubber-resin composite material.

INDUSTRIAL APPLICABILITY

As described above, according to the invention, even in the case that the folding angles of the door mirrors differ with the type of a vehicle, the shaft can be used in common among vehicles. Therefore, the number of kinds of parts of a door mirror can be reduced. Consequently, the productivity thereof can be enhanced.

The stopper member is constituted by two members, that is, the projection, which is formed in such a way as to be integral with the shaft base portion, and the angle adjusting plate provided separately from the projection. Thus, the strength of the stopper can be increased. Further, the material of the angle adjusting plate does not depend on the material of the shaft. Needless to say, the angle adjusting plate may be resinified. Moreover, the angle adjusting plate may be formed by selecting the material thereof from given materials in view of the strength, processability, and inexpensiveness.

The adjustment of the folding angle of the door mirror is mere an operation of inserting the bending pieces of the angle adjusting plate 30, 40, or 50 into the through holes 24a and 24b from the rear surface of the shaft in such a way as to sandwich the projection and as to be attached to both side surfaces or one of the side surfaces of the projection. Consequently, it is easy to attach the angle adjusting plate to the shaft.

What is claimed is:

1. A mirror for a door which comprises:

a mirror base mountable on a door and which has a projection portion;

a shaft positionable on a top surface of a projection portion of a mirror base, and in which a frame for supporting a mirror body is turnably fitted onto said shaft, and in which a stopper member for restricting a turning angle by engaging with said frame is provided between said frame and said shaft;

said stopper member comprising a projection which is formed on a base portion of said shaft in such a way as to be integral therewith, and an angle adjusting plate provided separately from said projection, said projection having opposite side surfaces;

said adjusting plate having a thickness corresponding to a folding angle of said door mirror and being attached to at least one of said opposite side surfaces of said projection.

2. A door mirror according to claim 1, wherein said adjusting plate is fixed to one of said shaft and said mirror base, and is positioned on said at least one of said side surfaces of said projection.

3. A door mirror according to claim 1 or 2, wherein said adjusting plate is fixed to said projection by one of a screwing connection, a bonding connection, and a fitting connection.

4. A door mirror according to claim 2 or 3, wherein said adjusting plates are respectively attached to both said side surfaces of said projection in such a way as to sandwich said projection therebetween and are formed so as to have thicknesses differing from each other.

* * * * *